(No Model.)

R. L. McLAREN.
AXLE BEARING.

No. 493,176. Patented Mar. 7, 1893.

Witnesses.
H. A. Shepherd.
Robert Everett.

Inventor.
Raynes L. McLaren.
By James L. Norris.
Atty.

THE NORRIS PETERS CO., PHOTO-LITHO., WASHINGTON, D. C.

UNITED STATES PATENT OFFICE.

RAYNES L. McLAREN, OF LONDON, ENGLAND.

AXLE-BEARING.

SPECIFICATION forming part of Letters Patent No. 493,176, dated March 7, 1893.

Application filed December 8, 1892. Serial No. 454,519. (No model.) Patented in England September 25, 1891, No. 16,321.

*To all whom it may concern:*

Be it known that I, RAYNES LAUDER MCLAREN, a citizen of England, residing at 96 Addison Road, Kensington, London, in the county of Middlesex, England, have invented new and useful Improvements in Shaft and Axle Bearings, more particularly applicable to axle-boxes for railway and tramway vehicles, (for which I have obtained a patent in Great Britain, No. 16,321, dated September 25, 1891,) of which the following is a specification.

My invention has for its object to protect the bearings of shafts or axles, such as plumber blocks, axle boxes and the like from the intrusion of dust or grit, and to inclose the part of the shaft or axle within the bearing in such a perfect manner notwithstanding any greater or less shifting of the shaft or axle's axis relatively to the axis of the bearing, that either the bearing can be entirely filled with liquid lubricant by exhausting the air from the bearing, or that a plenum of pressure can be maintained in it that shall keep the lubricant continually in effective contact with the shaft. As such angling may take place to a small extent in ordinary bearings, the invention is applicable to all kinds thereof; it is however applicable with more particular advantage to that construction of bearings in which special provision is made to allow of the free angling of the shaft or axle, for example when, in the case of a railway axle, the one wheel thereof is running upon a larger diameter than the other.

My invention consists in providing bearings with dust guards formed of two parts of hard metal or other suitable material, one of which parts fits with a central hole accurately round the axle, while its outer circumference is formed with a spherically convex surface that fits against a corresponding spherically concave surface formed in the second part which is fitted to slide vertically in a groove in the axle box, the parts being kept pressed tightly together by means of springs.

Figure 1:
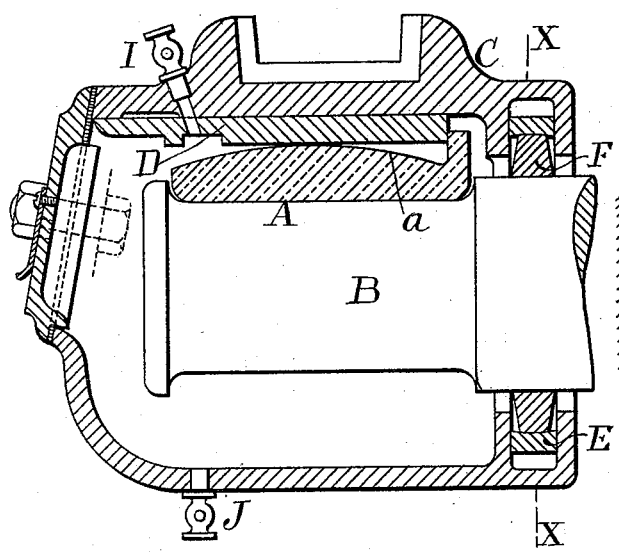
Figure 2:
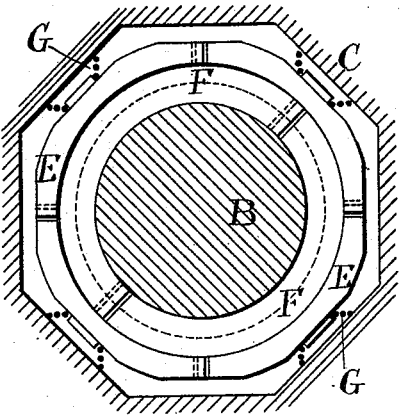
Figure 3:
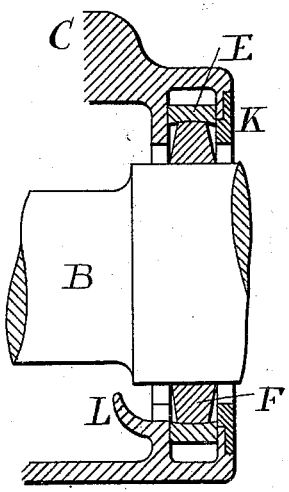
Figure 4:
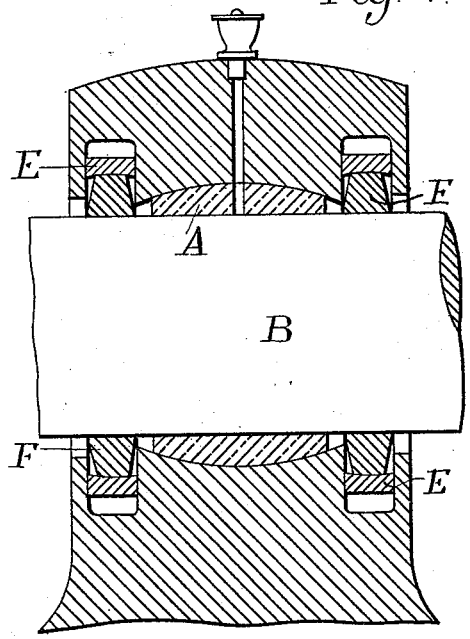

Figures 1 and 2 of the accompanying drawings shows an axle box specially constructed to allow of the free angling of the axle, with my improved dust guard applied thereto. Fig. 3 shows a modified form of the axle box, and Fig. 4 shows a section of a plumber-block for shafting constructed according to my invention. Fig. 1 shows a longitudinal section of the axle box with a cross section through the dust guard. Fig. 2 shows a cross section at X X.

The axle box is constructed with its brass A provided with a curved upper surface *a* bearing against the keeper or key D which fits the top of the axle box C in the usual manner, so that the axle B is free to assume any vertical angular position within certain limits, relatively to the axis of the axle box, while maintaining an effective bearing upon the brass.

For closing the annular space between the hole in the back end of the axle box and the axle, I employ a dust guard consisting first of a ring E formed of four segmental pieces of suitable material, which are tongued and grooved into each other so as to form close but adjustable joints, and secondly, a divided ring F, the inner surface of which is made to fit the periphery of the axle, while the outer surface is made spherical, so as to fit the corresponding hollow spherical surface formed on the inner periphery of the ring E. The parts of the ring F are also tongued and grooved into each other so as to form a close adjustable joint. The parts of the ring E are pressed on to the ring F by means of springs G which also press the halves of F closely against the axle. It will be seen that as the latter assumes a more or less angular position in the vertical direction, it will cant the ring F over in one direction or the other with it, causing its spherical periphery to shift more or less on the spherical surface of E, which in its turn will be moved upward or downward in the groove, in following the vertical displacement of the axle, the springs G (which may be either coiled as shown, or blade springs) maintaining the close contact during such motion.

The dust shield E F can be made to effect and maintain an air-tight or liquid-tight fit, so that by providing a passage in the axle box closed by a tap I, either the axle box can be entirely filled with liquid lubricant or air under pressure can be forced in, so as to insure in both cases that the lubricant will be maintained in effective contact with the bearing surfaces, and with the joints of the dust shield. Also, by exhausting the air through H I, a partial vacuum might be maintained in the box, whereby the external air in pressing against the outer surface of the dust shield will tend to press this against the inner side of the groove so as to maintain an air tight closure.

A cock J may be provided at the bottom of the box both for introducing the lubricant by suction on exhausting the air as described, and for discharging the lubricant when required. By these arrangements the frictional resistance of the axle journals may be very materially reduced, which is of great importance in the starting of a train, especially, as the oil cannot leave the contact surfaces of the journal and brass when standing any length of time. Also, the brasses, will run with less wear and tear, and will not run hot, and the oil being used over and over again, it will be employed economically.

With reduced risk of heating, smaller journals and boxes can be used, or smaller wheels, thus reducing both cost of construction and dead weight, which is an important point on heavily graded lines.

Fig. 3 shows a modification of the axle box, in which the outer side K of the groove is made as a separate plate, so as to be removable for facilitating the introduction of the dust shield. A lip L is also provided for leading the lubricant into the joints of the dust shield.

Fig. 4 shows my invention applied to a plumber-block for shafting, in which the brasses A may either be made nonadjustable in the ordinary manner, or with curved surfaces as shown. The dust shield, which in this case is applied on both sides, is constructed and operates in precisely the same manner as above described and is designated by the same letters and therefore requires no further description.

Having now particularly described and ascertained the nature of this invention and the best means I know of carrying the same into practical effect, I claim—

1. A dust shield for shaft or axle bearings consisting of a ring fitting round the shaft or axle and having its outer periphery formed with a convex spherical surface on which fits a corresponding concave spherical surface on a surrounding divided ring that is pressed against the inner ring by springs, substantially as described.

2. In a dust shield, the combination of a divided ring F adapted to fit closely round the shaft or axle B and having its outer periphery formed with a convex spherical surface, a second divided ring E formed with an inner concave spherical surface fitting the spherical surface of the ring F, and springs G adapted to press the outer ring E in close contact with the inner ring F, substantially as described.

In testimony whereof I have signed my name to this specification, in the presence of two subscribing witnesses, this 24th day of November, A. D. 1892.

RAYNES L. McLAREN.

Witnesses:
 CHARLES D. ABEL,
Chartered Patent Agent, 28 Southampton Buildings, London, W. C.
 GERALD L. SMITH,
Clerk to Messrs. Abel & Imray, Consulting Engineers and Patent Agents, 28 Southampton Buildings, London, W. C.